United States Patent [19]

John

[11] Patent Number: 5,220,514
[45] Date of Patent: Jun. 15, 1993

[54] METHOD & APPARATUS FOR LIQUID LEVEL CONDUCTANCE PROBE CONTROL UNIT WITH INCREASED SENSITIVITY

[75] Inventor: Robert S. John, Deerfield, Ill.

[73] Assignee: ITT Corporation, New York, N.Y.

[21] Appl. No.: 884,298

[22] Filed: May 12, 1992

Related U.S. Application Data

[63] Continuation of Ser. No. 508,147, Apr. 11, 1990, abandoned.

[51] Int. Cl.⁵ .............................................. G01F 23/24
[52] U.S. Cl. ................................ 364/509; 364/571.01; 73/304 R; 324/690; 324/691; 324/705; 340/620
[58] Field of Search ............... 364/509, 571.04, 571.01; 73/304 C, 304 R, 295; 324/690, 691, 705, 720; 340/620

[56] References Cited

U.S. PATENT DOCUMENTS

| | | | |
|---|---|---|---|
| 4,019,067 | 4/1977 | Gladstone | 340/620 X |
| 4,027,172 | 5/1977 | Hamelink | 340/620 X |
| 4,110,740 | 8/1978 | Akita et al. | 340/620 |
| 4,163,391 | 8/1979 | Bezard et al. | 73/295 |
| 4,259,982 | 4/1981 | Bartels | 137/392 |
| 4,263,587 | 4/1981 | John | 340/620 |
| 4,390,793 | 6/1983 | John | 73/304 R X |
| 4,513,616 | 4/1985 | Bezard et al. | 73/295 |
| 4,646,569 | 3/1987 | Cosser | 73/304 R |
| 4,723,122 | 2/1988 | Maltby et al. | 340/870.38 |
| 4,731,730 | 3/1988 | Hendrick et al. | 364/509 |
| 4,761,638 | 8/1988 | Lozano, Jr. | 340/620 |
| 4,902,962 | 2/1990 | Ishikawa | 324/690 |

Primary Examiner—Thomas G. Black
Assistant Examiner—Collin W. Park
Attorney, Agent, or Firm—Menotti J. Lombardi

[57] ABSTRACT

An apparatus and method employing a liquid level detection conductance probe mounted in a container to sense resistive differences between the probe and container depending upon the presence or absence of liquid therebetween. A sensing circuit senses probe signal variations and stores a probe signal. A comparator compares the stored probe signal to current probe signals and switches means connected to the comparator depending upon the presence or absence of liquid between the probe and container. The sensing circuit has sufficient sensitivity to differentiate between liquid between the probe and container and foam or scale deposits therebetween.

3 Claims, 5 Drawing Sheets

METHOD & APPARATUS FOR LIQUID LEVEL CONDUCTANCE PROBE CONTROL UNIT WITH INCREASED SENSITIVITY

This application is a continuation of application Ser. No. 07/508,147, filed Apr. 11, 1990, now abandoned.

BACKGROUND OF THE INVENTION

1. Field of the Invention

The invention relates to apparatus and method for detecting the level of a conductive fluid in a container and more specifically to such a system which has sufficient sensitivity to differentiate between liquid and foam or scale deposits between the probe and the container.

2. Description of the Prior Art

Liquid levels can be controlled by sensing the electrical conductance of the liquid. In a simple conductance level control the equivalent liquid resistance can be used to generate a signal to indicate the presence or absence of liquid at the probe with the probe placed at a critical level in a container.

In McDonnel and Miller's PS800 Series Probe Controls for example, an effective liquid resistance of up to 3,000 ohms can be distinguished from an open circuit at the probe, i.e. no liquid present. However, such simple probe controls cannot readily distinguish resistance of the liquid from resistance due to current leakage from fouling deposits on the probe surfaces or due to additives which may foam in the water.

In most conductance probe controls the probe is connected in series with a resistance network to monitor voltage across the probe as a function of the liquid impedance at the probe. Most such controls depend on a fixed comparison voltage level which determines the decision point value for the control of the output, established for example by a resistance network at the input, to a transistor or amplifier stage. The amplifier stage effectively starts to conduct at an input voltage determined by the characteristics of the stage itself. This fixed voltage level corresponds to a fixed limiting probe impedance value. Thus when the leakage resistance becomes less than about 3,000 ohms the circuit continues to indicate the presence of liquid at the probe, whether this is caused by liquid or only by fouling or foaming leakage currents. Cleaning and maintenance of the probe is then required to correct this condition.

In a boiler the water impedance seen by the probe can vary over wide limits depending on the concentration of contaminants such as boiler compounds, rust, calcium compounds, or other pollutants. City water for example, may measure 500 to 1,100 ohms using a typical conductance probe. However, in some instances, impedance of less than 10 ohms at the probe has been noted. Especially for such low water impedance, the ability of a control with a fouled probe to distinguish between water present or not present at the probe becomes very difficult due to the conduction of current through wet fouling on the probe surfaces.

It has been observed that the impedance of a heavily fouled probe in ohms increases by 5 to 10 times when the probe is out of water. For example, with a water impedance of 100 ohms the probe impedance with a low water level could be 500 to 1,000 ohms. For comparison, with the cited PS800 type control, such a probe would seem to remain in water due to its 3,000 ohm sensing limit being higher than the actual probe impedance.

Prior art patents include U.S. Pat. No. 3,119,266 Atkinson, U.S. Pat. No. 4,027,172, Hamelink and U.S. Pat. No. 4,390,793 John, all of which disclose probe controls which use a three electrode probe and none of which disclose storing and comparing a probe signal with a previously stored probe signal.

U.S. Pat. No. 4,019,067 Gladstone and U.S. Pat. No. 4,263,587 John disclose probe controls in which the probe signal is compared with a fixed reference which is a fixed characteristic of the amplifier stage used. None of the foregoing disclose a sensing circuit which has sufficient sensitivity to distinguish between the presence or absence of a liquid between the probe and the container and of foam or scale deposits therebetween.

THE PRESENT INVENTION

The foregoing problems can be avoided if the probe voltage is continuously compared to a stored reference sensing limit which is derived from the input of the probe voltage itself. The reference voltage can be stored in a digital or other long term memory. The associated control circuits then operate to reverse the output relay condition when the probe voltage crosses over the stored reference voltage. Further, in a typical circuit both the minimum and maximum water impedance which will allow the relay to be operated can be limited to desired impedance values within a broad range.

Typically the control input network resistance values may be chosen so that after a calibration an increase of more than several hundred ohms in probe impedance will turn off the burner. In a properly operating boiler, such an impedance change should not occur with water at the probe except over a long period of time. The recalibration times should be chosen to occur well within this constraint. On the other hand, a recalibration time should not be so frequent that the stored signal can follow rapid variations in water level for the boiler used in this control or effective control of water level would be lost. This could allow a probe fouled to some degree to continue to operate the boiler properly. The limits and circumstances for this operation may be varied in the probe input network to obtain desired control sensitivity, to probe in or out of water conditions.

Accordingly, it is an object of the invention to provide a apparatus and method for liquid level detection in which a probe signal is compared to a previously stored probe signal with sufficient sensitivity to differentiate between liquid between the probe and container and foam or scale deposits therebetween.

Another object of the invention is to provide reference and recalibration means for periodically recalibrating the means to store the probe signal.

A further object is to provide interruption prevention means in order to initiate or continue calibration of the storage means whenever the sensing circuit is falsely triggered to prematurely end calibration.

A still further object of the invention is to provide recalibration prevention means for preventing recalibration when liquid is not present at the probe for a given time.

SUMMARY OF THE INVENTION

The present invention includes a method and apparatus for detection of liquid level employing a container with a probe mounted therein to sense resistive difference between the probe and the container depending upon the presence or absence of liquid therebetween. A sensor circuit includes means to sense the probe signal variations, means to store the probe signal, a comparator to compare the probe signals with a previously stored probe signal and switching means connected to the comparator to be switched in accordance with the presence or absence of liquid between the probe and container. The apparatus is designed to have sufficient sensitivity in the sensing circuit to differentiate between liquid between the probe and container and foam or scale deposits therebetween.

Apparatus may be provided for recalibrating the storage means, continuing the calibration of the storage means whenever the sensing circuit is falsely triggered to prematurely end calibration and means for preventing recalibration when liquid is not present at the probe for a given time.

DETAILED DESCRIPTION OF PREFERRED EMBODIMENT

Figure 1:
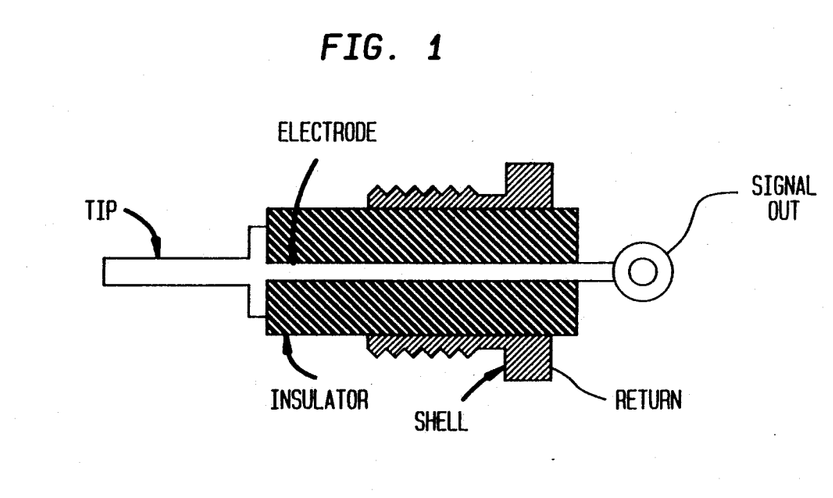
FIG. 1 is a cross-sectional diagram of the conductance probe of the invention.
Figure 2:
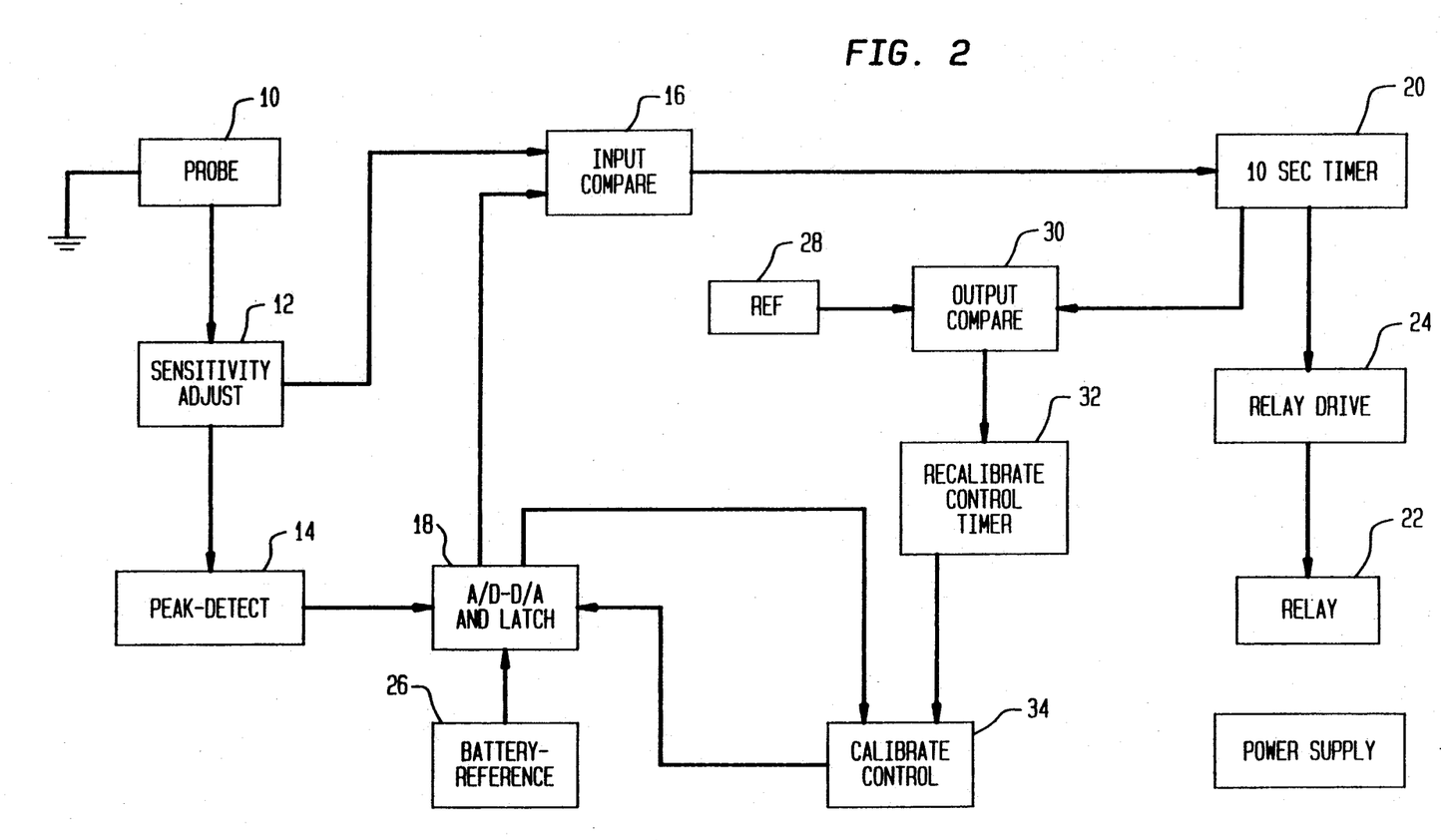
FIG. 2 is a block diagram of the sensing circuit of the invention.

Referring now to the drawings, FIG. 1 illustrates the cross section of a typical conductance probe. The tip and electrode conduct signal to the signal out ring and are all insulated by the insulator from the shell which provides a return connection to the container which is made of a conductive material (not illustrated). Turning now to FIG. 2, the control signal operation is as follows: the signal from the probe 10 is applied to a resistive network and adjusted in sensitivity by sensitivity adjust 12. Positive going signal peaks are detected in peak detector 14 and applied to an input comparator 16 which compares the probe signals with a stored analog of a previous probe signal stored in A/D-D/A and latch 18. A ten second timer/relay driver 20 is controlled by the output of input comparator 16 to determine the output relay status of relay 22 through a relay drive 24. The output relay may control a boiler burner or pump or other load.

A battery reference 26 is connected to converter and latch 18 as a power off supply to the oscillator counter and latch in 18 to retain previously stored information during power off periods. A reference voltage 28 is compared with the timing voltage on timer 20 in comparator 30 to prevent recalibration when liquid is not present at the probe for a given time by controlling the recalibration control timer 32.

Recalibration is controlled by calibrate control 34 which is controlled by the output of the A/D-D/A and latch 18 and recalibrate control timer 32. Operation of the block diagram of FIG. 2 will be better understood by referring to the circuit diagram of FIG. 3 wherein an AC voltage is applied from transformer 36 across a resistive divider constituting the impedance between the probe and the container 38 and a series of resistors 40, 42 and 44. The portion of the voltage appearing across resistor 44 is applied to one input of operational amplifier 46. This amplifier has a gain of one and includes a diode 48 inside the feedback loop. The output of amplifier 46 is applied to a capacitor 50 for signal storage. Due to the presence of diode 48 in the feedback loop the capacitor stores the peak output voltage with a time constant of several minutes. This output voltage is applied to the reference input of calibration comparator 64 which is active during calibration of the digitally stored signal to be used as a reference for probe signal analysis.

Figures 3, 3A:
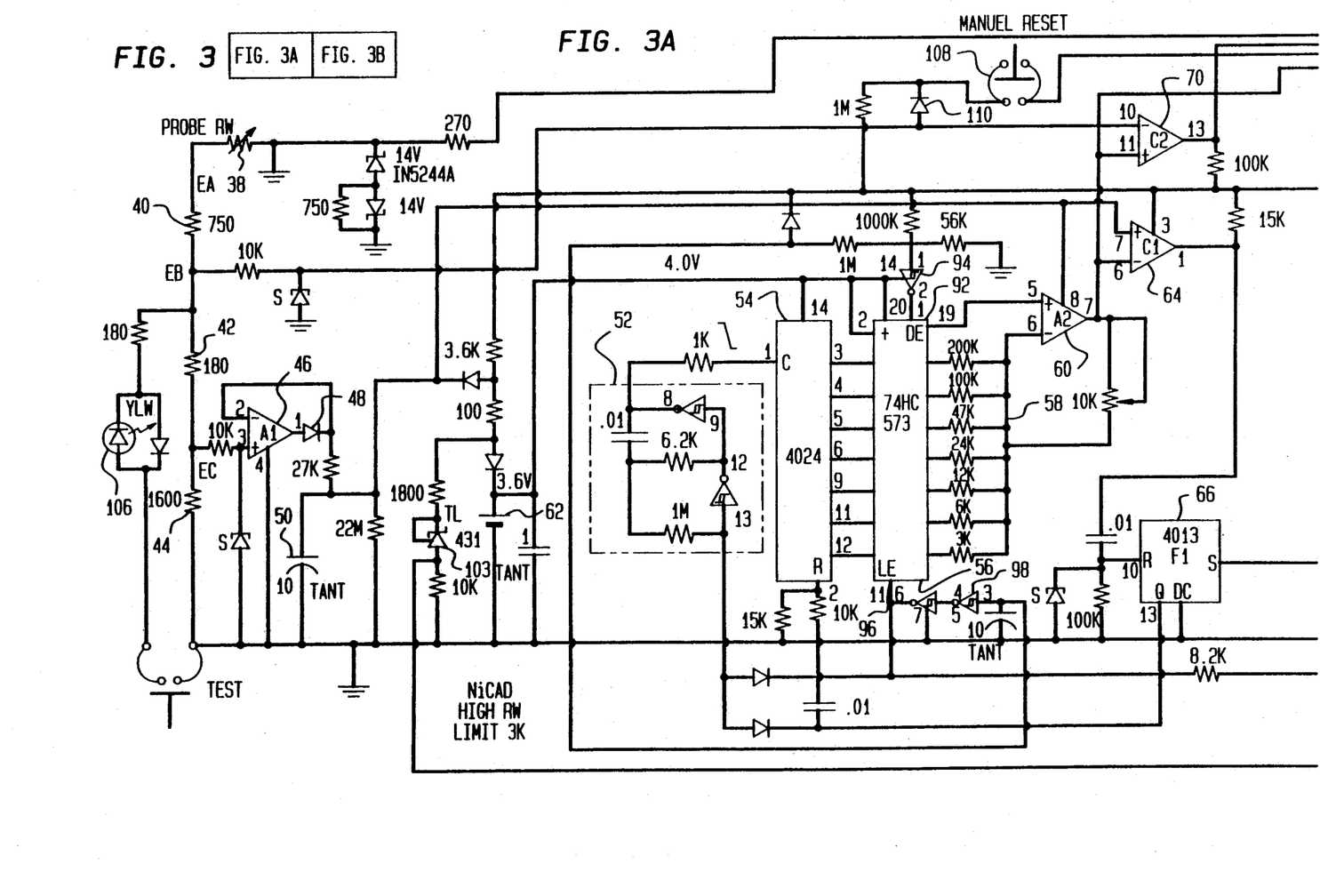
FIG. 3, 3A, and 3B show a circuit diagram of the sensing circuit of the invention.
Figure 3B:
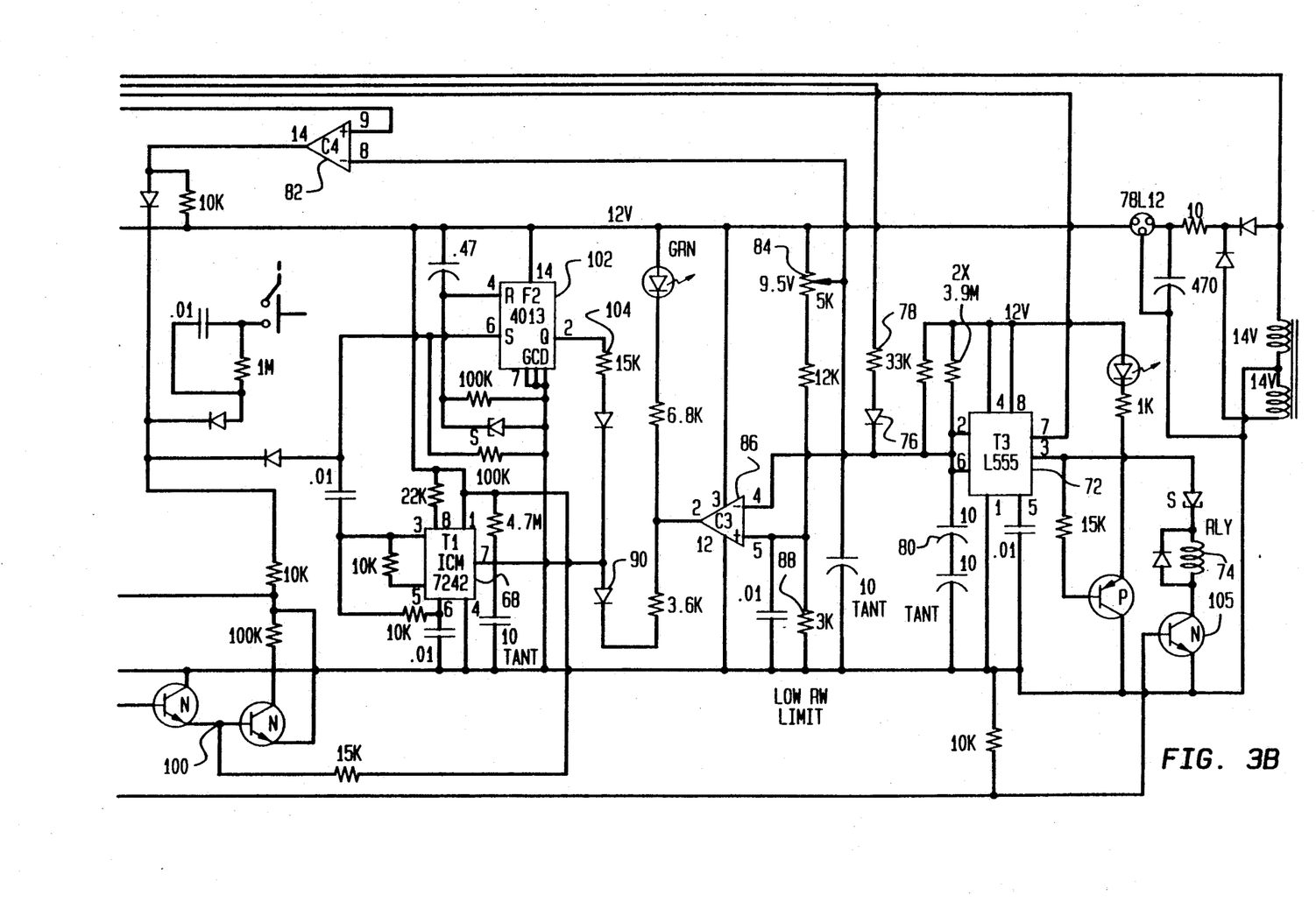

The calibration and reference signal storage proceeds as follows: the reference signal storage portion comprises a Schmidt trigger oscillator 52 which provides clock input to a 7 bit binary counter 54. The counter outputs a 7 bit digital word via a latch 56 to a binary resistor network 58 at the input of an operational amplifier 60. The other input to operational amplifier 60 is the reference voltage from a battery which may be a nickel cadmium battery of 3.6 volts 62. The gain of operational amplifier 60 is set so that over the range of 1 to 128 counts the operational amplifier output varies from approximately 3.6 volts to up to 10 volts. The battery 62 also serves as a power off supply for the Schmidt trigger 52, the 7 bit counter 54 and latch 56 during power off periods to retain previously stored information.

The output of operational amplifier 60 is applied as inputs to three comparators. One of these, calibration comparator 64, has as its other input the peak detected probe signal from capacitor 50. The output of comparator 64 goes positive when the input from operational amplifier 60 has a lower voltage than the peak detected signal input. Comparator 64 output is applied to reset a flip flop 66 which controls the calibration sequence by either clamping or releasing oscillator 52 at the input of 7 bit counter 54.

At the start of a recalibration cycle, flip-flop 66 is set by an output pulse from a counter timer 68 which produces pulses at its periodic rate to initiate recalibration using the existing peak detected probe signal. Upon generation of such a timing pulse, the timer pulse resets the 7 bit counter 54 and also sets the control flip-flop 66 which then releases the oscillator 52 to produce clock pulses to the 7 bit counter 54 input. The count outputs via the latch 56 are applied through the binary resistor network 58 to the operational amplifier 60 input to produce a voltage staircase of up to 128 steps in the range of 3.6–10 volts. This voltage is compared by comparator 64 to the peak probe signal on capacitor 50. When the staircase voltage becomes just lower in value than the probe signal the comparator 64 output goes from low to high level. This transition resets flip-flop 68 which then clamps off oscillator 52 at the particular count at which the probe signal exceeds the stored count by one count voltage increment. That is, approximately 10−3.6/128 volts=50 millivolts. A second comparator, input comparator 70, performs a similar comparison of the output of operational amplifier 60 to the peak AC input probe signal taken from the point between resistors 40 and 42 on the divider network. The output of input comparator 70 is used to ground the voltage at the timing resistance capacitive network of the 10 second timer 72 to hold its output high for actuation of a relay 74. If the probe signal input peaks become less than the operational amplifier 60 output then comparator 70 output goes high and the diode 76 in its output to the 10 second timer 72 becomes back biased. This allows the timer resistive capacitive network comprising resistor 78 and capacitors 80 to charge and in ten seconds the output of timer 72 goes low turning off the relay 74.

The output of operational amplifier 60 is also applied to one input of interruption prevention comparator 82 whose other input is obtained from a reference voltage at 84 which is slightly less than the maximum operational amplifier output of 10 volts. The output of comparator 82 is applied to set the input of the control flip-flop 66 and serves only to initiate or continue a calibration cycle whenever the output of operational amplifier 82 is triggered falsely to prematurely end the calibration cycle. This assures valid calibration counts. The digital reference signal is recalibrated periodically as controlled by the astable counter timer 68 circuit. The positive going outputs from this timer 68 are applied to set the output of the control flip-flop 66 high to initiate a calibration count sequence as described previously.

The remaining comparator 86 acts as a recalibration prevention comparator and has as a reference input a low non-zero voltage from resistor 88 to compare with the timing network voltage of timer 72 across capacitors 80. This comparator 86 is used to prevent unwanted recalibration of the stored probe signal by timer 68 when the water level is below the probe. The second input to the comparator 86 is connected to the ten second timer's resistance capacitance timing network across capacitors 80 as stated. Whenever water is present at the probe the timing network voltage is low and the output from comparator 86 is high. The diode 90 at the output of 86 is then back biased and the recalibration timing in timer 68 proceeds. If the water level goes below the probe, the output of comparator 86 goes low and the recalibration timing network is then clamped low, preventing further recalibration timing.

When power is first turned on to this circuit stray start up pulses can occur which may cause an incorrect stored probe reference signal. This result is avoided by control of the latch enable inputs to latch 56 which control input and output of the latch. The output enable 92 is connected via a Schmidt trigger 94 to the 12 volt DC supply derived from the AC input. In this way the latched outputs are presented to the binary resistors 58 only when the 12 volt DC is present to power the probe amplifiers, comparators, timer circuits and probe. At power turn on, the latch enable 96 for the digital latch 56 input signals is connected via an RC time delay to a Schmidt trigger 98 to delay application of the input signals to the latches. The Schmidt trigger 98 output is also connected to the oscillator 52 at the input of counter 54 to inhibit calibration cycles for approximately 8 to 10 seconds during which time the peak detector amplifier charges up to a proper level. The same Schmidt trigger 98 output is also connected via transistors 100 to the set input of flip-flop 66 cycle control to clamp out any unwanted stray pulses which would initiate a calibration cycle prematurely. Simultaneously at power turn on a second flip-flop 102 is connected to detect the rise of the 12 volt supply and connect a low value resistance 104 across the timing resistor of counter timer 68 to produce a pulse at its pin 3 for starting a calibration cycle at approximately 20 seconds after power turn on. This pulse also turns off flip-flop 102 at pin 6. After this initial action, flip-flop 102 remains inactive until the next power off time.

The count and memory integrated circuits 54 and 56 are powered by the rechargeable battery 62 to maintain data information during power outage periods. These integrated circuits are all digital CMOS with a property that output signals are always close to either zero volts DC or battery level volts DC. The battery 62 is diode connected to the peak detecting probe signal capacitor 50 in order that capacitor 50 storage voltage level can never be lower than battery voltage. The probe network resistors 40, 42 and 44 are then chosen such that this voltage corresponds to a maximum desired probe impedance here chosen to be 3,000 ohms. The overall result is that the relay will be turned off for probe input impedances of more than 3,000 ohms. The battery also is the reference input for operational amplifier 60. As a result, when latch 56 IC outputs are positive they have the same voltage as the reference input to amplifier 60 and no current is drawn by the binary resistors 58 connected to such outputs. Current is drawn only through binary resistors 58 whose latch outputs are at zero volts. The overall result is that amplifier 60 and related components can be operated from a single polarity power supply over the entire input signal range.

The battery 62 is seen to perform many essential circuit operations and therefore the battery voltage must be continuously available to ensure circuit reliability. If the battery voltage becomes too low for proper operation of the digital storage components then other system components could operate to keep the relay on continuously regardless of the probe signal level. To avoid this possibly unsafe result, a battery monitor circuit is included which enables relay operation only if the battery voltage is greater than 2.5 volts or other chosen safety values. The circuit consists of an integrated zener reference diode 103 which supplies base current to an npn transistor 104 which is connected in series with the relay return 74. Above 2.5 volts battery voltage the transistor 105 remains saturated to enable relay operation. Below 2.5 volts the transistor turns off and relay operation is inhibited.

The portion of the circuit including oscillator 52, counter 54, latch 56 and resistive network 58 may be implemented by the use of a EXAR digital sample and hold network employing a XR-2240.

A test switch function included in the control allows a user to determine that the system operates correctly without lowering the water level in the boiler. The LED 106 is shunted across the probe input signal network decreasing the input signal so that the circuits operate to turn off the output relay 74. This assures that the circuit performs its primary function properly.

A manual reset switch 108 is furnished when necessary to lock a burner out of operation whenever water level is low and the ten second time delay is completed. The output of timer 72 goes low at this condition and is connected via a diode 110 to clamp low the input of comparator 70, the probe input AC signal. The output of comparator 70 then goes high allowing the timing network voltage of timer 72 to remain high. This results in a clamped low output from timer 72 until the manual reset switch 108 is depressed to defeat the clamp to the input of comparator 70 and again allow normal response to probe input signals.

Figure 4:
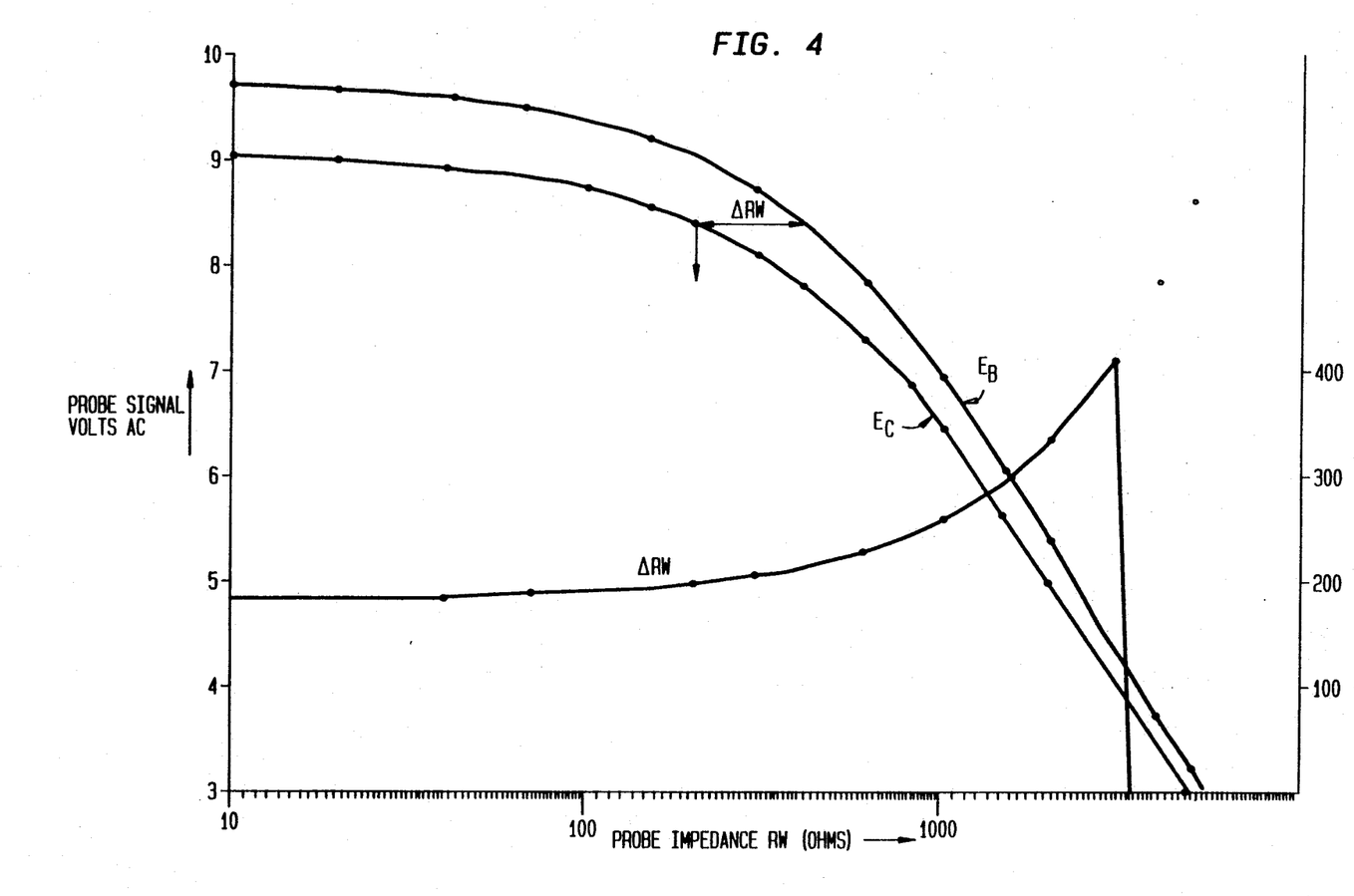
FIG. 4 is a graph showing typical performance of probe signal voltage verses impedance.

Typical circuit performance in relation to probe input signal is shown in FIG. 4 which shows curves for probe input network voltages verses water resistance at the probe and probe resistive difference between stored reference and probe input signals to cause relay turn off. The upper curve is the probe signal voltage at the point between resistors 40 and 42 in FIG. 3 labeled $E_b$. The second voltage with resistance curve labeled $E_c$ appears between resistors 42 and 44 of FIG. 3. A lower curve labeled $\Delta RW$ is the voltage verses impedance of the probe water resistance. For the example shown, it can be noted that the water impedance between 0 and 3,000 ohms an increase ranging from 200 to 400 ohms in probe resistance due to decreasing water level will turn off the relay drive input. The following equations apply:

1. $EC = 14C/(W+A+B+C)$;
2. $EB = 14(B+C)/(W+A+B+C)$;
3. $EA = 14(A+B+C)/(W+A+B+C)$
4. $EBC = EB-EC = 14B/(W+A+B+C)$ all where W, A, B and C represent probe impedance W and the three probe input network resistors 40, 42, and 44. 14 represents the peak probe voltage.

Accordingly, the features of the present invention are 1) sensitive detection of changes in liquid impedance at the probe; 2) liquid level variations analyzed independently of water conduction; 3) relay turn off when the probe impedance increases by 200–400 ohms resulting in high sensitivity to water level variations; 4) the probe input is periodically digitized and stored for use for succeeding probe signal analysis; 5) detection of water level in the presence of foam or probe fouling is permitted; 6) stored data is updated periodically to follow impedance changes due to water chemistry variations; 7) data may be stored up to 8 months resuming operation at previous conditions after power off periods; 8) no recalibration occurs when water level is low; 9) the battery monitor controls output relays against low battery voltage; 10) manual reset and test switch functions are available.

Since the principles of the invention have now been made clear, modifications which are particularly adapted for specific situations without departing from these principles will be apparent to those skilled in the art. The appended claims are intended to cover such modifications as well as the subject matter described and to only be limited by the true spirit and scope of the invention.

I claim:

1. An electrically conductive liquid level detection apparatus for a container having a conductive member in contact with the conductive liquid in the container and having a probe assembly mounted in said container to contact the liquid at least reaching a predetermined level in the container, and said probe assembly having a liquid level sensing probe member insulated electrically from said conductive member positioned to be contacted by the liquid in the container reaching said predetermined level, the apparatus being able to differentiate between liquid between said probe and container and foam or scale deposits there between comprising in combination:

a voltage divider including in said divider the resistance of the liquid between the container conductive member and the probe member;

a source of alternating current across said divider to produce a probe signal having positive voltage peaks;

said positive voltage peaks being coupled to one input of a comparator and to a peak detector for detecting said positive voltage peaks;

an A/D- D/A converter and digital latch circuit being coupled to said peak detector and having an analog voltage output representing a previously stored probe signal which is coupled to the other input of said comparator;

timing means being connected to the output of said comparator to control after a predetermined time a following coupled relay means which depending on the output of said comparator remains activated or is deactivated representing the presence or absence of the liquid between the conductive member and the probe member;

reference and recalibration means being connected between said timing means and a calibrate control means for automatically and periodically recalibrating; and said calibrate control means being connected to said A/D-D/A converter and latch circuit to control calibration thereof and prevent the automatic and periodic recalibration when the liquid between the conductive member and the probe member are not present for a given time such that if the voltage at said one input of said comparator is higher than said other input, the output of said comparator is low and the output on said timer means is high resulting in the relay of said relay means remaining activated, and if the voltage at said one input is lower than said other input, said comparator output is high and the timing means charges for a period of time after which if the input comparator output goes low turning off the relay of said relay means.

2. The combination of claim 1, wherein said reference recalibration means includes an oscillator and a binary counter connected to provide an input to said latch circuit, a binary resistor network and an operational amplifier, means connecting the output of said latch circuit to the input of said operational amplifier, a reference voltage connected to define the peak value of the latch circuit output voltage, and means connecting the other input of said operational amplifier to said reference voltage, said reference voltage also being connected as a power-off supply to said oscillator, counter, and latch circuit during power-off periods to retain voltages previously stored; and the combination further including a calibration comparator, means connecting the output of the operational amplifier to an input of said calibration comparator, means applying said stored voltage on said capacitor to the other input of said calibration comparator such that its output goes positive when the input from the operational amplifier is lower than the voltage peaks, a flip-flop and means connecting the output of said calibrations comparator to the input of said flip-flop and said flip-flop to said oscillator to either clamp or release said oscillator to cease or release said oscillator to cease or commence recalibration respectively, a counter-timer for producing pulses to initiate recalibration, and means connecting the output of said counter-timer to said counter to reset it and to said flip-flop to release the oscillator to run until the latch circuit output is just below the peak probe signal causing the recalibration comparator output to go from low to high resetting said flip-flop and clamping off the oscillator completing recalibration.

3. The combination of claim 2 including an interruption prevention comparator, means connecting the output of the operational amplifier to one input of the interruption prevention comparator, a second source of reference voltage slightly lower than the maximum output of the operational amplifier, means connecting said second source to the other input of said interruption prevention comparator, means connecting the output of said interruption prevention comparator to said flip-flop to initiate or continue a calibration cycle whenever the output of the operational amplifier is falsely triggered to prematurely end the calibration cycle, a recalibration prevention comparator, a third source of low voltage connected to one input of said recalibration prevention comparator, means connecting the timer means to the other input of said recalibration prevention comparator, and means connecting the output of said recalibration prevention comparator through a diode to said counter-timer such that when liquid is present at said probe member the timing voltages is low and the output from the recalibration prevention comparator is high back biasing said diode and keeping said timer-counter on, and when liquid is not present at the probe for a given time the output of the recalibration prevention comparator is low forward biasing said diode preventing further calibrations.

* * * * *